United States Patent
Oyama et al.

(10) Patent No.: US 10,090,517 B2
(45) Date of Patent: Oct. 2, 2018

(54) CATHODE MATERIAL FOR LITHIUM-ION SECONDARY BATTERY, CATHODE FOR LITHIUM-ION SECONDARY BATTERY, AND LITHIUM-ION SECONDARY BATTERY

(71) Applicant: Sumitomo Osaka Cement Co., Ltd, Tokyo (JP)

(72) Inventors: Masataka Oyama, Tokyo (JP); Takao Kitagawa, Tokyo (JP)

(73) Assignee: SUMITOMO OSAKA CEMENT CO., LTD., Tokyo (JP)

(*) Notice: Subject to any disclaimer, the term of this patent is extended or adjusted under 35 U.S.C. 154(b) by 70 days.

(21) Appl. No.: 15/281,598

(22) Filed: Sep. 30, 2016

(65) Prior Publication Data
US 2017/0250399 A1    Aug. 31, 2017

(30) Foreign Application Priority Data
Feb. 26, 2016 (JP) ................ 2016-035887

(51) Int. Cl.
| | |
|---|---|
| *H01M 4/36* | (2006.01) |
| *H01M 4/58* | (2010.01) |
| *H01M 4/62* | (2006.01) |
| H01M 10/0525 | (2010.01) |
| H01M 4/02 | (2006.01) |
| H01M 10/42 | (2006.01) |

(52) U.S. Cl.
CPC ............ *H01M 4/364* (2013.01); *H01M 4/36* (2013.01); *H01M 4/366* (2013.01); *H01M 4/5825* (2013.01); *H01M 4/625* (2013.01); H01M 10/0525 (2013.01); H01M 2004/028 (2013.01); H01M 2010/4292 (2013.01)

(58) Field of Classification Search
CPC ...... H01M 4/36; H01M 10/0525; H01M 4/58; H01M 4/62; H01M 4/364; H01M 4/366; H01M 4/5825; H01M 4/625; H01M 2004/028; H01M 2010/4292
See application file for complete search history.

(56) References Cited

U.S. PATENT DOCUMENTS

| | | | | |
|---|---|---|---|---|
| 2002/0106562 A1* | 8/2002 | Sato | ........................ | C01B 25/45 429/221 |
| 2004/0005265 A1* | 1/2004 | Chiang | ............... | H01M 4/5825 423/306 |
| 2007/0259271 A1* | 11/2007 | Nanno | ................ | H01M 2/0267 429/318 |
| 2009/0130559 A1* | 5/2009 | Okada | ..................... | C01B 25/45 429/224 |
| 2011/0027651 A1* | 2/2011 | Sun | ......................... | C01B 15/00 429/220 |
| 2015/0132660 A1 | 5/2015 | Ravet et al. | | |
| 2015/0270544 A1* | 9/2015 | Yoshida | ................ | H01M 4/485 429/209 |

FOREIGN PATENT DOCUMENTS

| | | |
|---|---|---|
| JP | 2001015111 A | 1/2001 |
| JP | 2006190528 A | 7/2006 |

OTHER PUBLICATIONS

JP2006190528 MT, Jul. 2006.*
Journal of Applied Physics 111, Nov. 26, 2002 (2012).*
Decision to grant Patent issued JPO for Application No. 2016-035887 dated Nov. 28, 2016 (Year: 2016).*
Japanese Office Action for Japanese Application No. 2016-035887 dated Aug. 2, 2016.

* cited by examiner

*Primary Examiner* — Alexander Usyatinsky
(74) *Attorney, Agent, or Firm* — Merchant & Gould P.C.

(57) ABSTRACT

A cathode material for a lithium-ion secondary battery includes a cathode material A which includes central particles of a cathode active material represented by $Li_xA_yM_zPO_4$ and a carbonaceous film with which surfaces of the central particles are coated and a cathode material B which is represented by $Li_xA_yM_zPO_4$ and is made of primary particles of a cathode active material having an olivine structure.

3 Claims, 1 Drawing Sheet

CATHODE MATERIAL FOR LITHIUM-ION SECONDARY BATTERY, CATHODE FOR LITHIUM-ION SECONDARY BATTERY, AND LITHIUM-ION SECONDARY BATTERY

CROSS-REFERENCE TO RELATED APPLICATIONS

This application claims the benefit of Japanese Patent Application No. 2016-035887 filed Feb. 26, 2016, the disclosure of which is herein incorporated by reference in its entirety.

BACKGROUND OF THE INVENTION

Field of the Invention

The present invention relates to a cathode material for a lithium-ion secondary battery, a cathode for a lithium-ion secondary battery, and a lithium-ion secondary battery.

Description of Related Art

In recent years, as batteries anticipated to have a small size and a high capacity and weigh less, non-aqueous electrolytic solution-based secondary batteries such as lithium-ion secondary batteries have been proposed and put into practical use. Lithium-ion secondary batteries are constituted of a cathode and an anode which have properties capable of reversibly intercalating and deintercalating lithium ions, and a non-aqueous electrolyte.

As anode active materials for anode materials of lithium-ion secondary batteries, generally, carbon-based materials or Li-containing metal oxides having properties capable of reversibly intercalating and deintercalating lithium ions are used. Examples of the Li-containing metal oxides include lithium titanate ($Li_4Ti_5O_{12}$).

Meanwhile, as cathode materials of lithium-ion secondary batteries, cathode material mixtures including a cathode active material, a binder, and the like are used. As the cathode active material, for example, Li-containing metal oxides having properties capable of reversibly intercalating and deintercalating lithium ions such as lithium iron phosphate ($LiFePO_4$) are used. In addition, cathodes of lithium-ion secondary batteries are formed by applying the cathode material mixture onto the surface of a metal foil that is called a current collector.

As electrolytic solutions for lithium-ion secondary batteries, non-aqueous solvents are used. Non-aqueous solvents enable the application of cathode active materials that oxidize and reduce at a high potential or anode active materials that oxidize and reduce at a low potential, whereby lithium-ion secondary batteries having a higher voltage can be realized.

These lithium-ion secondary batteries have a smaller size and a higher energy and weigh less than secondary batteries in the related art such as lead batteries, nickel cadmium batteries, and nickel metal hydride batteries. Therefore, lithium-ion secondary batteries are used not only as small-size power supplies used in portable electronic devices such as mobile phones and notebook personal computers but also as large-size stationary emergency power supplies.

In addition, recently, a broad range of studies have been continued regarding using lithium-ion secondary batteries for moving vehicles such as electrical vehicles, plug-in hybrid vehicles, and hybrid vehicles. For lithium-ion secondary batteries used for these moving vehicles, service lives of ten years or longer are required, and thus how to ensure long-term safety becomes important.

As cathode materials for lithium-ion secondary batteries having high safety, lithium phosphate compounds including lithium iron phosphate are well known. In these lithium phosphate compounds, since oxygen is strongly bonded to phosphorus by means of covalent bonding, it is difficult for oxygen to be released from crystals, and stability is excellent.

However, these lithium phosphate compounds have a problem of poor electron conductivity. Therefore, as a method for increasing the electron conductivity of cathode materials, for example, the following technique is known. The surfaces of the primary particles of a cathode active material are coated with an organic compound which is a carbon source, and then the organic compound is carbonized. In such a case, a conductive carbon film is formed on the surface of the cathode active material, and it is possible to interpose carbon in the conductive carbon film as an electron-conductive substance. A method for manufacturing a cathode material having increased electron conductivity in the above-described manner has been disclosed (for example, refer to Japanese Laid-open Patent Publication No. 2001-15111).

The effect of the conductive carbon film is extremely strong, and, in a case in which a lithium phosphate compound is used as a cathode material for lithium-ion secondary batteries, it has become common to form a conductive carbon film on the surfaces of the primary particles.

PRIOR ART REFERENCE

Patent Literature

[Patent Literature 1] JP2001-15111

SUMMARY OF THE INVENTION

Electrolytic solutions which are used for ordinary commercially available lithium-ion secondary batteries (for example, electrolytic solutions in which ethyl carbonate, diethyl carbonate, ethylmethylcarbonate, or the like is used as a solvent) oxidize and decompose on the surface of a cathode when a voltage exceeding 4.2 V (vs Li/Li+) is applied thereto. At this time, moisture in the cathode or functional groups such as a hydroxyl group on the surface of the cathode active material which is coated with a carbonaceous film react with the electrolytic solution, thereby generating gas such as carbon dioxide. This gas causes a decrease in the capacity due to a decrease in the interface between the cathode active material and the electrolytic solution, degradation of safety, and degradation of long-term cycle characteristics.

The above-described oxidation and decomposition of electrolytic solutions also occur in a case in which lithium phosphate compounds are used as a cathode material for lithium-ion secondary batteries. For example, in lithium phosphate compounds containing manganese, lithium ions are intercalated and deintercalated due to the oxidation and reduction of manganese at near 4.1 V (vs Li/Li+). Therefore, in lithium-ion secondary batteries in which a cathode including the lithium phosphate compound is used, it is easy to reach the oxidation and decomposition potential of electrolytic solutions, and gas is also easily generated due to the decomposition of electrolytic solutions. In addition, since there are cases in which the oxidation and decomposition potential of electrolytic solutions is exceeded due to over charge, there is a possibility that the oxidation and decomposition of electrolytic solutions may occur regardless of which cathode active material being used.

In addition, regarding the oxidation and decomposition of electrolytic solutions or the generation of gas due to the decomposition of electrolytic solutions, in the related art, the oxidation and decomposition of electrolytic solutions and the generation of gas are measured by performing long-term cycle tests of 1,500 hours or over charge tests in which batteries are damaged by applying a high voltage to the batteries for a short period of time; however, in these methods, it has not been possible to control a decrease in the capacity, degradation of safety, or degradation of long-term cycle characteristics which are attributed to the generation of gas at a high voltage.

The present invention has been made in consideration of the above-described circumstances, and an object of the present invention is to provide a cathode material for a lithium-ion secondary battery which suppresses the oxidation and decomposition of electrolytic solutions and the generation of gas when the oxidation and decomposition potential of the electrolytic solutions is reached, a cathode for a lithium-ion secondary battery, and a lithium-ion secondary battery including the cathode.

As a result of intensive studies, the present inventors and the like found that, when a cathode including a cathode material A which has properties capable of reversibly intercalating and deintercalating lithium ions and includes a carbonaceous film that plays an important role as a cathode material for a lithium-ion secondary battery and a cathode material B including no carbonaceous films on the surfaces of primary particles as cathode materials that play a role of suppressing the oxidation and decomposition of electrolytic solutions and the generation of gas is formed, and this cathode is applied to lithium-ion secondary batteries, it is possible to significantly suppress the oxidation and decomposition of electrolytic solutions and the generation of gas, and completed the present invention.

In addition, as a result of intensive studies, the present inventors and the like found that, when the ratio (the discharge capacity b/the discharge capacity a×100) between the discharge capacity a obtained when a lithium-ion secondary battery including a cathode including a cathode material for a lithium-ion secondary battery and an anode made of lithium metal is constant current charged at a current value of 0.1 C in an environment of 60° C. until the battery voltage reaches 4.2 V, then, is constant voltage charged until the current value reaches 0.01 C, and then is constant current discharged until the battery voltage reaches 2 V at the current value of 0.1 C and the discharge capacity b obtained when the lithium-ion secondary battery is constant current charged at a current value of 0.1 C in an environment of 60° C. until the battery voltage reaches 4.5 V, then, is constant voltage charged for seven days, and then is constant current discharged until the battery voltage reaches 2 V at the current value of 0.1 C is set to 40% or higher, it is possible to obtain a cathode material for a lithium-ion secondary battery which suppresses the oxidation and decomposition of electrolytic solutions and the generation of gas at a high voltage, has excellent capacity retention, and also has excellent safety and long-term cycle characteristics, and completed the present invention.

That is, the present invention provides the following means.

A cathode material for a lithium-ion secondary battery of the present invention comprises a cathode material A which includes central particles of a cathode active material represented by $Li_xA_yM_zPO_4$ ($0 \leq x \leq 1.1$, $0.8 \leq y \leq 1.1$, and $0 \leq z \leq 0.2$; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements) and a carbonaceous film with which surfaces of the central particles are coated; and a cathode material B which is represented by $Li_xA_yM_zPO_4$ ($0 \leq x \leq 1.1$, $0.8 \leq y \leq 1.1$, and $0 \leq z \leq 0.2$; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements) and is made of primary particles of a cathode active material having an olivine structure.

A cathode material for a lithium-ion secondary battery of the present invention, in which a ratio (a discharge capacity b/a discharge capacity a×100) between the discharge capacity a obtained when a lithium-ion secondary battery in which the cathode material for a lithium-ion secondary battery is used for a cathode and natural graphite is used for an anode is constant current charged at a current value of 0.1 C in an environment of 60° C. until a battery voltage reaches 4.2 V, then, is constant voltage charged until the current value reaches 0.01 C, and then is constant current discharged until the battery voltage reaches 2 V at the current value of 0.1 C and the discharge capacity b obtained when the lithium-ion secondary battery is constant current charged at a current value of 0.1 C in an environment of 60° C. until the battery voltage reaches 4.5 V, then, is constant voltage charged for seven days, and then is constant current discharged until the battery voltage reaches 2 V at the current value of 0.1 C is 40% or higher.

A cathode for a lithium-ion secondary battery of the present invention includes the cathode material for a lithium-ion secondary battery of the present invention.

A lithium-ion secondary battery of the present invention includes a cathode; an anode; and a non-aqueous electrolyte, in which the cathode is the cathode for a lithium-ion secondary battery of the present invention.

According to the present invention, when a cathode including a cathode material A which has properties capable of reversibly intercalating and deintercalating lithium ions and includes a carbonaceous film that plays an important role as a cathode material for a lithium-ion secondary battery and a cathode material B including no carbonaceous film on the surfaces of primary particles as cathode materials that play a role of suppressing the oxidation and decomposition of electrolytic solutions and the generation of gas is formed, and this cathode is applied to lithium-ion secondary batteries, it is possible to suppress the oxidation and decomposition of electrolytic solutions and the generation of gas and realize lithium-ion secondary batteries having excellent long-term cycle stability and excellent safety.

DETAILED DESCRIPTION OF THE INVENTION

Figure 1:
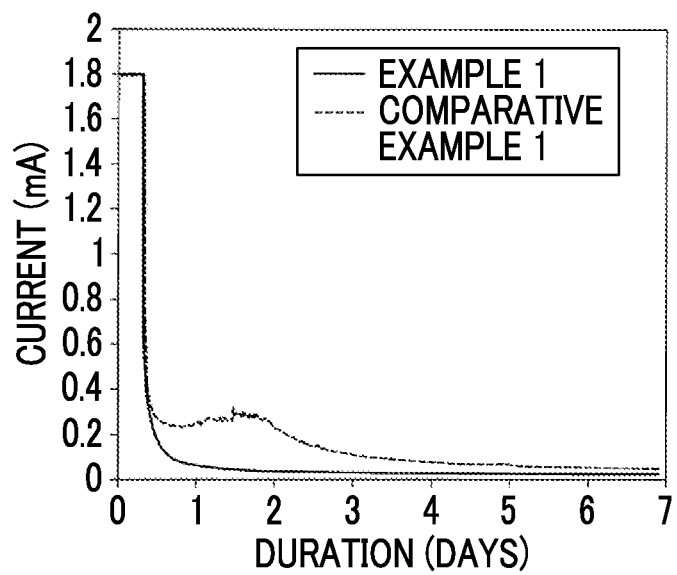
FIG. 1 is a view illustrating the fluctuation of current values during over charge tests in Example 1 and Comparative Example 1.

Embodiments of a cathode material for a lithium-ion secondary battery, a cathode for a lithium-ion secondary battery, and a lithium-ion secondary battery of the present invention will be described.

Meanwhile, the present embodiment is specific description for better understanding of the gist of the invention and does not limit the present invention unless particularly otherwise described.

Cathode Material for Lithium-Ion Secondary Battery

A cathode material for a lithium-ion secondary battery of the present embodiment comprises a cathode material A which includes central particles of a cathode active material represented by $Li_xA_yM_zPO_4$ ($0 \leq x \leq 1.1$, $0.8 \leq y \leq 1.1$, and $0 \leq z \leq 0.2$; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements) and a carbonaceous film with which surfaces of the central particles are coated; and a cathode material B which is represented by $Li_xA_yM_zPO_4$ ($0 \leq x \leq 1.1$, $0.8 \leq y \leq 1.1$, and $0 \leq z \leq 0.2$; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements) and is made of primary particles of a cathode active material having an olivine structure.

The optimal mixing ratio between the cathode material A and the cathode material B is determined depending on the primary particle diameter of the cathode material A, the supporting amount of carbon, the primary particle diameter of the cathode material B, and the like, but the mass ratio between the cathode material A and the cathode material B, that is, the mass ratio of the cathode material B to the cathode material A (the cathode material B/the cathode material A) is preferably 0.002 or more and 0.1 or less and more preferably 0.008 or more and 0.06 or less.

When the mass ratio (the cathode material B/the cathode material A) is 0.002 or more, the number of contact points between the cathode material A and the cathode material B increases, and the oxidation and decomposition of electrolytic solutions can be sufficiently suppressed. On the other hand, when the mass ratio (the cathode material B/the cathode material A) is 0.1 or less, there are no cases in which the content of the cathode material B having low electron conductivity is excessive, and thus it is possible to suppress electron conduction being delayed in cathodes, and it is possible to suppress the capacity of lithium-ion secondary batteries being decreased.

In addition, in the cathode material for a lithium-ion secondary battery of the present embodiment, the ratio (the discharge capacity b/the discharge capacity a×100) between the discharge capacity a obtained when a lithium-ion secondary battery which includes a cathode including the cathode material for a lithium-ion secondary battery and an anode made of lithium metal is constant current charged at a current value of 0.1 C in an environment of 60° C. until a battery voltage reaches 4.2 V, then, is constant voltage charged until the current value reaches 0.01 C, and then is constant current discharged until the battery voltage reaches 2 V at the current value of 0.1 C and the discharge capacity b obtained when the lithium-ion secondary battery is constant current charged at a current value of 0.1 C in an environment of 60° C. until the battery voltage reaches 4.5 V, then, is constant voltage charged for seven days, and then is constant current discharged until the battery voltage reaches 2 V at the current value of 0.1 C is 40% or higher.

When the ratio between the discharge capacity a and the discharge capacity b (the discharge capacity b/the discharge capacity a×100) is 40% or higher, it is possible to obtain a cathode material for a lithium-ion secondary battery which suppresses the oxidation and decomposition of electrolytic solutions (non-aqueous electrolytes) and the generation of gas at a high voltage, has excellent capacity retention, and also has excellent safety and long-term cycle characteristics.

Cathode Material A

The cathode material A comprises central particles of a cathode active material represented by $Li_xA_yM_zPO_4$ ($0 \leq x \leq 1.1$, $0.8 \leq y \leq 1.1$, and $0 \leq z \leq 0.2$; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements) and a carbonaceous film with which the surfaces of the central particles are coated.

The average primary particle diameter of the cathode material A (primary particles in which the surfaces of the central particles are coated with the carbonaceous film) is preferably 0.01 μm or more and 5 μm or less and more preferably 0.02 μm or more and 1 μm or less.

When the average primary particle diameter of the cathode material A is 0.01 μm or more, the specific surface area of the cathode material A increases, whereby it is possible to suppress an increase in the mass of necessary carbon and suppress a decrease in the charge and discharge capacity of lithium-ion secondary batteries. On the other hand, when the average primary particle diameter of the cathode material A is 5 μm or less, it is possible to suppress an increase in time taken for lithium ions or electrons to migrate in the cathode material A. Therefore, it is possible to suppress output characteristics being deteriorated due to an increase in the internal resistance of lithium-ion secondary batteries.

Here, the average particle diameter refers to the volume-average particle diameter. The average primary particle diameter of the primary particles of the central particles can be measured using a laser diffraction and scattering particle size distribution measurement instrument or the like. In addition, it is also possible to arbitrarily select multiple primary particles observed using a scanning electron microscope (SEM) and compute the average particle diameter of the primary particles.

The amount of carbon in the cathode material A is preferably 0.1% by mass or more and 10% by mass or less and more preferably 0.3% by mass or more and 3% by mass or less.

When the amount of carbon is 0.1% by mass or more, the discharge capacity of lithium-ion secondary batteries at a high charge-discharge rate increases, and it is possible to realize sufficient charge and discharge rate performance. On the other hand, when the amount of carbon is 10% by mass or less, it is possible to suppress the battery capacity of lithium-ion secondary batteries per unit mass of the cathode material A being decreased more than necessary. Meanwhile, this decrease in the battery capacity is caused by the excessive amount of carbon.

The supporting amount of carbon with respect to the specific surface area of the primary particles of the central particles constituting the cathode material A ([the supporting amount of carbon]/[the specific surface area of the primary particles of the central particles]) is preferably 0.01 or more and 0.5 or less and more preferably 0.03 or more and 0.3 or less.

When the supporting amount of carbon is 0.01 or more, the discharge capacity of lithium-ion secondary batteries at a high charge-discharge rate increases, and it is possible to realize sufficient charge and discharge rate performance. On the other hand, when the supporting amount of carbon is 0.5 or less, it is possible to suppress the battery capacity of lithium-ion secondary batteries per unit mass of the cathode material A being decreased more than necessary. Meanwhile, this decrease in the battery capacity is caused by the excessive amount of carbon.

The specific surface area of the cathode material A is preferably 5 m$^2$/g or more and more preferably 7 m$^2$/g or more.

When the specific surface area of the cathode material A is 5 m$^2$/g or more, the coarsening of the particles of the cathode material A is suppressed, and thus it is possible to increase the diffusion rate of lithium among the particles. Therefore, it is possible to improve the battery characteristics of lithium-ion secondary batteries.

In addition, the upper limit value of the specific surface area of the cathode material A is not particularly limited as long as a desired effect can be obtained and may be 50 m$^2$/g or less and may be 20 m$^2$/g or less.

Central Particles

The central particles constituting the cathode material A in the present embodiment are the central particles of a cathode active material represented by $Li_xA_yM_zPO_4$ (0≤x≤1.1, 0.8≤y≤1.1, and 0≤z≤0.2; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements).

Meanwhile, the rare earth elements refer to 15 elements of La, Ce, Pr, Nd, Pm, Sm, Eu, Gd, Tb, Dy, Ho, Er, Tm, Yb, and Lu which belong to the lanthanum series.

The average primary particle diameter of the primary particles of the central particles constituting the cathode material A in the present embodiment is preferably 0.001 μm or more and 5 μm or less and more preferably 0.02 μm or more and 1 μm or less.

When the average primary particle diameter of the primary particles of the central particles is 0.001 μm or more, it is possible to sufficiently coat the surfaces of the primary particles of the central particles with the carbonaceous film. In addition, it is possible to increase the discharge capacity of lithium-ion secondary batteries during high-speed charge and discharge and realize sufficient charge and discharge performance. On the other hand, when the average primary particle diameter of the primary particles of the central particles is 5 μm or less, it is possible to decrease the internal resistance of the primary particles of the central particles. In addition, it is possible to increase the discharge capacity of lithium-ion secondary batteries during high-speed charge and discharge.

The shape of the primary particles of the central particles constituting the cathode material A in the present embodiment is not particularly limited. However, the shape of the primary particles of the central particles is preferably a spherical shape since it is easy to generate the cathode material A made of spherical, particularly, truly spherical secondary particles.

Another reason for the shape of the primary particles of the central particles being preferably a spherical shape is that it is possible to decrease the amount of a solvent when cathode material paste is prepared by mixing the cathode material for a lithium-ion secondary battery, a binder resin (binding agent), and a solvent. In addition, still another reason for the shape of the primary particles of the central particles being preferably a spherical shape is that it becomes easy to apply the cathode material paste to current collectors. Furthermore, when the shape of the primary particles of the central particles is a spherical shape, the surface area of the primary particles of the central particles is minimized, and thus it is possible to minimize the amount of the binder resin (binding agent) blended into the cathode material paste. As a result, it is possible to decrease the internal resistance of cathodes for which the cathode material for a lithium-ion secondary battery of the present embodiment is used. In addition, when the shape of the primary particles of the central particles is a spherical shape, it becomes easy to closely pack the cathode material A, and thus the amount of the cathode material for a lithium-ion secondary battery packed per unit volume of the cathode increases. As a result, it is possible to increase the cathode density, and high-capacity lithium-ion secondary batteries can be obtained.

Carbonaceous Film

The carbonaceous film coats the surfaces of the central particles and improves the electrical conductivity of the cathode material A.

The thickness of the carbonaceous film is preferably 0.2 nm or more and 10 nm or less and more preferably 0.5 nm or more and 4 nm or less.

When the thickness of the carbonaceous film is 0.2 nm or more, it is possible to prevent the excessively thin thickness of the carbonaceous film from disabling the formation of films having a desired resistance value. In addition, it is possible to ensure conductive properties suitable for the cathode material A. On the other hand, when the thickness of the carbonaceous film is 10 nm or less, it is possible to suppress a decrease in the battery capacity per unit mass of the cathode material A.

In addition, when the thickness of the carbonaceous film is 0.2 nm or more and 10 nm or less, it becomes easy to closely pack the cathode material A, and thus the amount of the cathode material for a lithium-ion secondary battery packed per unit volume of the cathode increases. As a result, it is possible to increase the electrode density, and high-capacity lithium-ion secondary batteries can be obtained.

Cathode Material B

The cathode material B is represented by $Li_xA_yM_zPO_4$ (0≤x≤1.1, 0.8≤y≤1.1, and 0≤z≤0.2; here, A represents at least one selected from the group consisting of Fe, Mn, Co, and Ni, and M represents at least one selected from the group consisting of Mg, Ca, Co, Sr, Ba, Ti, Zn, B, Al, Ga, In, Si, Ge, and rare earth elements) and is made of the primary particles of an electrode active material having an olivine structure. That is, the cathode material B is represented by $Li_xA_yM_zPO_4$ and is made of the primary particles of a cathode active material including no carbonaceous films on the surface.

The average primary particle diameter of the primary particles of the cathode material B is preferably 0.01 μm or more and 10 μm or less and more preferably 0.05 μm or more and 5 μm or less.

When the average primary particle diameter of the primary particles of the cathode material B is 0.01 μm or more, lithium diffusion among crystals is sufficiently slow, the primary particles are capable of being present in a bi-phase state of a low potential when high voltage is applied, and it becomes easy for charges to migrate (be relaxed) between the cathode material A and the cathode material B. On the other hand, when the average primary particle diameter of the primary particles of the cathode material B is 10 μm or less, the number of contact points between the cathode material A and the cathode material B increases, and it becomes easy for charges to migrate (be relaxed) between the cathode material A and the cathode material B.

In the cathode material for a lithium-ion secondary battery of the present embodiment, the cathode active material (the central particles) of the cathode material A and the cathode active materials of the cathode material B may be identical to or different from each other.

According to the cathode material for a lithium-ion secondary battery of the present embodiment, since the cathode material comprises the cathode material A comprising the carbonaceous film that plays an important role as the cathode material for a lithium-ion secondary battery and the cathode material B comprising no carbonaceous films on the surfaces of the primary particles, in a case in which a cathode for a lithium-ion secondary battery is produced using this cathode material for a lithium-ion secondary battery, and this cathode for a lithium-ion secondary battery is used as a cathode in a lithium-ion secondary battery, it is possible to significantly suppress the oxidation and decomposition of electrolytic solutions and the generation of gas.

Method for Manufacturing Cathode Material for Lithium-Ion Secondary Battery

The cathode material for a lithium-ion secondary battery of the present embodiment can be manufactured by mixing the cathode material A and the cathode material B.

A method for mixing the cathode material A and the cathode material B is not particularly limited as long as the cathode material A and the cathode material B are uniformly mixed together, but a mixing method using an air flow is preferably used since it is possible to suppress cathode active material particles (central particles, primary particles) being damaged.

In addition, it is more preferable to mix the cathode materials using an air flow in which dry air, dried inert gas, or the like is used since the adsorption of moisture to the cathode material A and the cathode material B is prevented.

Method for Manufacturing Cathode Material A

A method for manufacturing the cathode material A in the present embodiment comprises, for example, a step of manufacturing cathode active material particles and a precursor of the cathode active material particles, a slurry preparation step of mixing at least one cathode active material particle raw material selected from the group consisting of the cathode active material particles and the precursor of the cathode active material particles, an organic compound which is a carbonaceous film precursor, and water, thereby preparing a slurry, and a calcination step of drying the slurry and calcinating the obtained dried substance in a non-oxidative atmosphere.

Step of Manufacturing Cathode Active Material Particles and Precursor of Cathode Active Material Particles As a method for manufacturing a compound represented by $Li_xA_yM_zPO_4$, it is possible to use a method in the related art such as a solid-phase method, a liquid-phase method, or a gas-phase method. Examples of $Li_xA_yM_zPO_4$ obtained using this method include a particulate substance (hereinafter, in some cases, referred to as "$Li_xA_yM_zPO_4$ particles").

The $Li_xA_yM_zPO_4$ particles can be obtained by, for example, hydrothermally synthesizing a slurry-form mixture obtained by mixing a Li source, an A source, a P source, water, and, if necessary, a M source. According to the hydrothermal synthesis, $Li_xA_yM_zPO_4$ is generated in water in a precipitate form. The obtained precipitate may be a precursor of $Li_xA_yM_zPO_4$. In this case, target $Li_xA_yM_zPO_4$ particles can be obtained by calcinating the precursor of $Li_xA_yM_zPO_4$.

In the hydrothermal synthesis, a pressure-resistant airtight container is preferably used.

Here, examples of the Li source include lithium salts such as lithium acetate ($LiCH_3COO$) and lithium chloride (LiCl), lithium hydroxide (LiOH), and the like. Among these, as the Li source, at least one selected from the group consisting of lithium acetate, lithium chloride, and lithium hydroxide is preferably used.

Examples of the A source include chlorides, carboxylates, sulfates, and the like which include at least one selected from the group consisting of Fe, Mn, Co, and Ni. For example, in a case in which A in $Li_xA_yM_zPO_4$ is Fe, examples of a Fe source include divalent iron salts such as iron (II) chloride ($FeCl_2$), iron (II) acetate ($Fe(CH_3COO)_2$), andiron (II) sulfate ($FeSO_4$). Among these, as the Fe source, at least one selected from the group consisting of iron (II) chloride, iron (II) acetate, and iron (II) sulfate is preferably used.

Examples of the M source include chlorides, carboxylates, sulfates, and the like which include at least one selected from the group consisting of Mg, Ca, Co, Sr, Ba, Ti, Zn, B, Al, Ga, In, Si, Ge, and rare earth elements.

Examples of the P source include phosphoric acid compounds such as phosphoric acid ($H_3PO_4$), ammonium dihydrogen phosphate ($NH_4H_2PO_4$), and diammonium hydrogen phosphate ($(NH_4)_2HPO_4$). Among these, as the P source, at least one selected from the group consisting of phosphoric acid, ammonium dihydrogen phosphate, and diammonium hydrogen phosphate is preferably used.

Slurry Preparation Step

In the slurry preparation step, since the organic compound which is a carbonaceous film precursor is interposed among the cathode active material particles and the components are uniformly mixed together, the surfaces of the cathode active material particles can be evenly coated with the organic compound.

Furthermore, in the calcination step, the organic compound with which the surfaces of the cathode active material particles are coated carbonizes, thereby obtaining the cathode material A including the cathode active material particles uniformly coated with the carbonaceous film.

The organic compound that is used in the method for manufacturing the cathode material A in the present embodiment is not particularly limited as long as the compound is capable of forming the carbonaceous film on the surfaces of the cathode active material particles. Examples of the organic compound include polyvinyl alcohol (PVA), polyvinyl pyrrolidone, cellulose, starch, gelatin, carboxymethyl cellulose, methyl cellulose, hydroxymethyl cellulose, hydroxyethyl cellulose, polyacrylic acid, polystyrene sulfonate, polyacrylamide, polyvinyl acetate, glucose, fructose, galactose, mannose, maltose, sucrose, lactose, glycogen, pectin, alginic acid, glucomannan, chitin, hyaluronic acid, chondroitin, agarose, polyethers, divalent alcohols such as ethylene glycol, trivalent alcohols such as glycerin, and the like.

In the slurry preparation step, the cathode active material particle raw material and the organic compound are dissolved or dispersed in water, thereby preparing a homogeneous slurry.

When these raw materials are dissolved or dispersed in water, it is also possible to add a dispersant.

A method for dissolving or dispersing the cathode active material particle raw material and the organic compound in water is not particularly limited as long as the cathode active material particle raw material is dispersed in water, and the organic compound is dissolved or dispersed in water. The above-described method is preferably a method in which a medium stirring-type dispersing apparatus that stirs medium particles at a high speed such as a planetary ball mill, an oscillation ball mill, a bead mill, a paint shaker, or an attritor is used.

When the cathode active material particle raw material and the organic compound are dissolved or dispersed in water, it is preferable to disperse the cathode active material particle raw material in water in a primary particle form, then, add the organic compound to water, and stir the organic compound so as to be dissolved or dispersed. In such a case, the surfaces of the primary particles of the cathode active material particle raw material are easily coated with the organic compound. Therefore, the organic compound is uniformly distributed on the surfaces of the primary particles of the cathode active material particle raw material, and consequently, the surfaces of the primary particles of the cathode active material particles are coated with the carbonaceous film derived from the organic compound.

Calcination Step

Next, the slurry prepared in the slurry preparation step is sprayed and dried in a high-temperature atmosphere, for example, in the atmosphere of 70° C. or higher and 250° C. or lower.

Next, the obtained dried substance is calcinated in a non-oxidative atmosphere at a temperature of preferably 500° C. or higher and 1,000° C. or lower and more preferably 600° C. or higher and 1,000° C. or lower for 0.1 hours or longer and 40 hours or shorter.

The non-oxidative atmosphere is preferably an atmosphere filled with an inert gas such as nitrogen ($N_2$), argon (Ar), or the like. In a case in which it is necessary to further suppress the oxidation of the dried substance, a reducing atmosphere including approximately several percentages by volume of a reducing gas such as hydrogen ($H_2$) is preferred. In addition, for the purpose of removing organic components evaporated in the non-oxidative atmosphere during calcination, a susceptible or burnable gas such as oxygen ($O_2$) may be introduced into the non-oxidative atmosphere.

Here, when the calcination temperature is set to 500° C. or higher, it is easy for the organic compound in the dried substance to be sufficiently decomposed and reacted, and the organic compound is easily and sufficiently carbonized. As a result, it is easy to prevent the generation of a decomposed substance of the high-resistance organic compound in the obtained agglomerate. Meanwhile, when the calcination temperature is set to 1,000° C. or lower, lithium (Li) in the cathode active material particle raw material is not easily evaporated, and the cathode active material particles being grown to be equal to or larger than the target size is suppressed. As a result, in a case in which a lithium-ion secondary battery including a cathode including the cathode material of the present embodiment is produced, it is possible to prevent the discharge capacity at a high charge-discharge rate from becoming low, and it is possible to realize a lithium-ion secondary battery having sufficient charge and discharge rate performance.

By means of the above-described steps, the cathode material A in which the surfaces of the primary particles of the cathode active material particles are coated with carbon (the carbonaceous film) generated by the thermal decomposition of the organic compound in the dried substance can be obtained.

Method for Manufacturing Cathode Material B

A method for manufacturing the cathode material B in the present embodiment includes, for example, a step of manufacturing cathode active material particles and a precursor of the cathode active material particles and a calcination step of calcinating the obtained cathode active material particles and the obtained precursor of the cathode active material particles in a non-oxidative atmosphere.

In the method for manufacturing the cathode material B, the cathode active material particles and the precursor of the cathode active material particles are manufactured in the same manner as in the method for manufacturing the cathode material A.

Cathode for Lithium-Ion Secondary Battery

The cathode for a lithium-ion secondary battery of the present embodiment (hereinafter, in some cases, referred to as "cathode") comprises the cathode material for a lithium-ion secondary battery of the present embodiment. In more detail, the cathode of the present embodiment comprises a current collector made of a metal foil and a cathode mixture layer formed on the current collector, and the cathode mixture layer comprises the cathode material for a lithium-ion secondary battery of the present embodiment. That is, the cathode of the present embodiment is obtained by forming a cathode mixture layer on one main surface of the current collector using the cathode material for a lithium-ion secondary battery of the present embodiment.

The cathode of the present embodiment is mainly used as a cathode for a lithium-ion secondary battery.

Since the cathode for a lithium-ion secondary battery of the present embodiment comprises the cathode material for a lithium-ion secondary battery of the present embodiment, in the case of being used as a cathode in a lithium-ion secondary battery, it is possible to significantly suppress the oxidation and decomposition of electrolytic solutions and the generation of gas.

Method for Manufacturing Cathode for Lithium-Ion Secondary Battery

The method for manufacturing the cathode of the present embodiment is not particularly limited as long as a cathode mixture layer can be formed on one main surface of a current collector using the cathode material for a lithium-ion secondary battery of the present embodiment. Examples of the method for manufacturing the cathode of the present embodiment include the following method.

First, the cathode material for a lithium-ion secondary battery of the present embodiment, a binding agent made of a binder resin, and a solvent are mixed together, thereby preparing cathode material paste. At this time, to the cathode material paste in the present embodiment, a conductive auxiliary agent such as carbon black may be added thereto if necessary.

Binding Agent

As the binding agent, that is, the binder resin, for example, a polytetrafluoroethylene (PTFE) resin, a polyvinylidene fluoride (PVdF) resin, fluorine rubber, or the like is preferably used.

The amount of the binding agent blended into the cathode material for a lithium-ion secondary battery of the present embodiment is not particularly limited, and is, for example, preferably 1 part by mass or more and 30 parts by mass or less and more preferably 3 parts by mass or more and 20 parts by mass or less with respect to 100 parts by mass of the cathode material.

When the amount of the binding agent blended is 1 part by mass or more, it is possible to sufficiently increase the binding property between the cathode mixture layer and the current collector. Therefore, it is possible to prevent the cathode mixture layer from being cracked or dropped during the formation of the cathode mixture layer by means of rolling or the like. In addition, it is possible to prevent the cathode mixture layer from being peeled off from the current collector in a process of charging and discharging lithium-ion secondary batteries and prevent the battery capacity or the charge-discharge rate from being decreased. On the other hand, when the amount of the binding agent blended is 30 parts by mass or less, it is possible to prevent the internal resistance of the cathode material for a lithium-ion secondary battery from being decreased and prevent the battery capacity at a high-speed charge and discharge rate from being decreased.

Conductive Auxiliary Agent

The conductive auxiliary agent is not particularly limited, and, for example, at least one selected from the group consisting of fibrous carbon such as acetylene black (AB), KETJEN BLACK, furnace black, vapor-grown carbon fiber (VGCF), and carbon nanotube is used.

Solvent

The solvent that is used in the cathode material paste including the cathode material for a lithium-ion secondary battery of the present embodiment is appropriately selected depending on the properties of the binding agent. When the solvent is appropriately selected, it is possible to facilitate the cathode material paste to be applied to substances to be coated such as current collectors.

Examples of the solvent include water, alcohols such as methanol, ethanol, 1-propanol, 2-propanol (isopropyl alcohol: IPA), butanol, pentanol, hexanol, octanol, and diacetone alcohol, esters such as ethyl acetate, butyl acetate, ethyl lactate, propylene glycol monomethyl ether acetate, propylene glycol monoethyl ether acetate, and γ-butyrolactone, ethers such as diethyl ether, ethylene glycol monomethyl ether (methyl cellosolve), ethylene glycol monoethyl ether (ethylcellosolve), ethylene glycol monobutyl ether (butyl cellosolve), diethylene glycol monomethyl ether, and diehtylene glycol monoethyl ether, ketones such as acetone, methyl ethyl ketone (MEK), methyl isobutyl ketone (MIBK), acetylacetone, and cyclohexanone, amides such as dimethyl formamide, N,N-dimethylacetoacetamide, and N-methyl-2-pyrrolidone (NMP), glycols such as ethylene glycol, diethylene glycol, and propylene glycol, and the like. These solvents may be used singly, or a mixture of two or more solvents may be used.

The content rate of the solvent in the cathode material paste is preferably 50% by mass or more and 70% by mass or less and more preferably 55% by mass or more and 65% by mass or less in a case in which the total mass of the cathode material for a lithium-ion secondary battery of the present embodiment, the binding agent, and the solvent is set to 100 parts by mass.

When the content rate of the solvent in the cathode material paste is in the above-described range, it is possible to obtain cathode material paste having excellent cathode formability and excellent battery characteristics.

A method for mixing the cathode material for a lithium-ion secondary battery of the present embodiment, the binding agent, the conductive auxiliary agent, and the solvent is not particularly limited as long as these components can be uniformly mixed together. Examples thereof include mixing methods in which a kneader such as a ball mill, a sand mill, a planetary (sun-and-planet) mixer, a paint shaker, or a homogenizer is used.

The cathode material paste is applied to one main surface of the current collector so as to form a coated film, and then this coated film is dried, thereby obtaining the current collector having a coated film made of a mixture of the cathode material and the binding agent formed on one main surface. After that, the coated film is pressed by pressure and is dried, thereby producing a cathode having a cathode mixture layer on one main surface of the current collector.

Lithium-Ion Secondary Battery

A lithium-ion secondary battery of the present embodiment includes a cathode, an anode, and a non-aqueous electrolyte, in which the cathode is the cathode for a lithium-ion secondary battery of the present invention. Specifically, the lithium-ion secondary battery of the present embodiment includes the cathode for a lithium-ion secondary battery of the present embodiment as a cathode, an anode, a separator, and a non-aqueous electrolyte.

In the lithium-ion secondary battery of the present embodiment, the anode, the non-aqueous electrolyte, and the separator are not particularly limited.

Anode

Examples of the anode include anodes including an anode material such as Li metal, carbon materials such as natural graphite and hard carbon, Li alloys, $Li_4Ti_5O_{12}$, $Si(Li_{4.4}Si)$, and the like.

Non-Aqueous Electrolyte

Examples of the non-aqueous electrolyte include non-aqueous electrolytes obtained by mixing ethylene carbonate (EC) and ethyl methyl carbonate (EMC) so that the volume ratio reaches 1:1 and dissolving lithium hexafluorophosphate ($LiPF_6$) in the obtained solvent mixture so that the concentration reaches 1 $mol/dm^3$.

Separator

As the separator, it is possible to use, for example, porous propylene.

In addition, instead of the non-aqueous electrolyte and the separator, a solid electrolyte may be used.

Since the lithium-ion secondary battery of the present embodiment comprises the cathode for a lithium-ion secondary battery of the present embodiment as the cathode, the oxidation and decomposition of electrolytic solutions and the generation of gas are suppressed, and long-term cycle stability and safety are excellent.

EXAMPLES

Hereinafter, the present invention will be more specifically described using examples and comparative examples, but the present invention is not limited to the following examples.

Example 1

Synthesis of Cathode Material A

Lithium phosphate ($Li_3PO_4$) (2 mol) and iron (II) sulfate ($FeSO_4$) (2 mol) were mixed with water (2 L) so that the total amount reached 4 L, thereby preparing a homogeneous slurry-form mixture.

Next, this mixture was stored in a pressure-resistant airtight container having a capacity of 8 L and was hydrothermally synthesized at 180° C. for one hour, thereby generating a precipitate.

Next, the precipitate was washed with water, thereby obtaining a cake-form precursor of a cathode active material.

Next, a polyvinyl alcohol (5.5 g) as the organic compound and zirconia balls (500 g) having a diameter of 5 mm as medium particles were mixed with this precursor of the cathode active material (150 g in terms of solid contents), and a dispersion treatment was performed in a ball mill for 12 hours, thereby preparing a homogeneous slurry.

Next, the slurry was sprayed in the atmosphere at 180° C. and dried, thereby obtaining a granulated body constituted of $LiFePO_4$ coated with the organic compound having an average particle diameter of 6 μm.

The obtained granulated body was calcinated in a non-oxidative gas atmosphere for one hour at 700° C. and then was held at 40° C. for 30 minutes, thereby obtaining LiFePO$_4$ having a conductive carbonaceous film (cathode material A1).

Synthesis of Cathode Material B

Lithium phosphate (Li$_3$PO$_4$) (2 mol) and iron (II) sulfate (FeSO$_4$) (2 mol) were mixed with water (2 L) so that the total amount reached 4 L, thereby preparing a homogeneous slurry-form mixture.

Next, this mixture was stored in a pressure-resistant airtight container having a capacity of 8 L and was hydrothermally synthesized at 190° C. for six hours, thereby generating a precipitate.

Next, the precipitate was washed with water, thereby obtaining a cake-form precursor of a cathode active material.

Next, the cake-form precursor of the cathode active material was dried under reduced pressure at 50° C. for 24 hours, thereby obtaining LiFePO$_4$ having no conductive carbonaceous film (cathode material B1).

Mixing of Cathode Material A and Cathode Material B

The cathode material A1 and the cathode material B1 were uniformly mixed together so that the mass ratio (the cathode material B/the cathode material A) reached 0.053, and the obtained powder was considered as a cathode material for a lithium-ion secondary battery (cathode material C1) of Example 1.

Production of Lithium-Ion Secondary Battery

The cathode material C1, polyvinylidene fluoride (PVdF) as a binding agent, and acetylene black (AB) as a conductive auxiliary agent were added to N-methyl-2-pyrrolidone (NMP) which was a solvent so that the mass ratio (the cathode material C1:AB:PVdF) in paste reached 90:5:5, and the components were mixed together, thereby preparing cathode material paste (for the cathode).

Next, the cathode material paste (for the cathode) was applied onto the surface of a 30 μm-thick aluminum foil (current collector) so as to form a coated film, and the coated film was dried, thereby forming a cathode mixture layer on the surface of the aluminum foil, and the thickness of the cathode mixture layer was adjusted so that the capacity ratio between the cathode and the anode reached 1.2 (the cathode/the anode).

After that, the cathode mixture layer was pressed by a predetermined pressure so that the cathode density reached 2.0 g/mL, and a tetragonal piece having a cathode area of 9 cm$^2$ was obtained by means of punching using a forming machine, thereby producing a cathode of Example 1.

Next, natural graphite as an anode active material, styrene butadiene rubber (SBR) as a binding agent, and carboxymethyl cellulose (CMC) as a viscosity-adjusting material were added to pure water which was a solvent so that the mass ratio (natural graphite:SBR:CMC) in paste reached 98:1:1, and the components were mixed together, thereby preparing anode material paste (for the anode).

Next, the anode material paste (for the anode) was applied onto the surface of a 10 μm-thick copper foil (current collector) so as to form a coated film, and the coated film was dried, thereby forming an anode mixture layer on the surface of the copper foil.

The coating thickness was adjusted so that the weight of the anode mixture layer reached 4.4 mg/cm$^2$. The anode mixture layer was pressed by a predetermined pressure so that the anode density reached 1.42 g/mL, and then a tetragonal piece having an anode area of 9.6 cm$^2$ was obtained by means of punching using a forming machine, thereby producing an anode of Example 1.

Next, the cathode and the anode were made to face each other through a 25 μm-thick separator made of polypropylene, were immersed in a 1M LiPF$_6$ solution (0.5 mL) as an electrolytic solution, and were sealed with laminate films, thereby producing a lithium-ion secondary battery of Example 1. As the LiPF$_6$ solution, a solution obtained by mixing ethylene carbonate and ethyl methyl carbonate so that the volume ratio reached 1:1 was used.

Example 2

Synthesis of Cathode Material A

A cathode material A2 of Example 2 was obtained in the same manner as in Example 1.

Synthesis of Cathode Material B

A cathode material B2 of Example 2 was obtained in the same manner as in Example 1 except for the fact that manganese (II) sulfate (MnSO$_4$) was used instead of iron (II) sulfate (FeSO$_4$).

Mixing of Cathode Material A and Cathode Material B

A cathode material C2 of Example 2 was obtained in the same manner as in Example 1 except for the fact that the cathode material A2 and the cathode material B2 of Example 2 were used.

Production of Lithium-Ion Secondary Battery

A lithium-ion secondary battery of Example 2 was produced in the same manner as in Example 1 except for the fact that the cathode material C2 of Example 2 was used.

Example 3

Synthesis of Cathode Material A

Lithium phosphate (Li$_3$PO$_4$) (2 mol), manganese (II) sulfate (MnSO$_4$) (1.4 mol), and iron (II) sulfate (FeSO$_4$) (0.6 mol) were mixed with water (2 L) so that the total amount reached 4 L, thereby preparing a homogeneous slurry-form mixture.

Next, this mixture was stored in a pressure-resistant airtight container having a capacity of 8 L and was hydrothermally synthesized at 180° C. for one hour, thereby generating a precipitate.

Next, the precipitate was washed with water, thereby obtaining a cake-form precursor of a cathode active material.

Next, a polyvinyl alcohol (5.5 g) as the organic compound and zirconia balls (500 g) having a diameter of 5 mm as medium particles were mixed with this precursor of the cathode active material (150 g in terms of solid contents), and a dispersion treatment was performed in a ball mill for 12 hours, thereby preparing a homogeneous slurry.

Next, the slurry was sprayed in the atmosphere at 180° C. and dried, thereby obtaining a granulated body constituted of LiMn$_{0.7}$Fe$_{0.3}$PO$_4$ coated with the organic compound having an average particle diameter of 6 μm.

The obtained granulated body was calcinated in a non-oxidative gas atmosphere for one hour at 700° C. and then was held at 40° C. for 30 minutes, thereby obtaining LiMn$_{0.7}$Fe$_{0.3}$PO$_4$ having a conductive carbonaceous film (cathode material A3).

Synthesis of Cathode Material B

A cathode material B3 of Example 3 was obtained in the same manner as in Example 2.

Mixing of Cathode Material A and Cathode Material B

A cathode material C3 of Example 3 was obtained in the same manner as in Example 1 except for the fact that the cathode material A3 and the cathode material B3 of Example 3 were used.

Production of Lithium-Ion Secondary Battery

A lithium-ion secondary battery of Example 3 was produced in the same manner as in Example 1 except for the fact that the cathode material C3 of Example 3 was used.

Example 4

Synthesis of Cathode Material A

A cathode material A4 of Example 4 was obtained in the same manner as in Example 1.

Synthesis of Cathode Material B

A cathode material B4 of Example 4 was obtained in the same manner as in Example 1.

Mixing of Cathode Material A and Cathode Material B

The cathode material A4 and the cathode material B4 were uniformly mixed together so that the mass ratio (the cathode material B/the cathode material A) reached 0.01, and the obtained powder was considered as a cathode material for a lithium-ion secondary battery (cathode material C4) of Example 4.

Production of Lithium-Ion Secondary Battery

A lithium-ion secondary battery of Example 4 was produced in the same manner as in Example 1 except for the fact that the cathode material C4 of Example 4 was used.

Comparative Example 1

Synthesis of Cathode Material A

A cathode material A11 of Comparative Example 1 was obtained in the same manner as in Example 1.

Production of Lithium-Ion Secondary Battery

A lithium-ion secondary battery of Comparative Example 1 was produced in the same manner as in Example 1 except for the fact that the cathode material A11 of Comparative Example 1 was used as the cathode material.

Comparative Example 2

Synthesis of Cathode Material A

A cathode material A12 of Comparative Example 2 was obtained in the same manner as in Example 2.

Production of Lithium-Ion Secondary Battery

A lithium-ion secondary battery of Comparative Example 2 was produced in the same manner as in Example 1 except for the fact that the cathode material A12 of Comparative Example 2 was used as the cathode material.

Comparative Example 3

Synthesis of Cathode Material A

A cathode material A13 of Comparative Example 3 was obtained in the same manner as in Example 1.

Synthesis of Cathode Material B

A cathode material B13 of Comparative Example 3 was obtained in the same manner as in Example 1.

Mixing of Cathode Material A and Cathode Material B

The cathode material A13 and the cathode material B13 were uniformly mixed together so that the mass ratio (the cathode material B/the cathode material A) reached 0.001, and the obtained powder was considered as a cathode material for a lithium-ion secondary battery (cathode material C13) of Comparative Example 3.

Production of Lithium-Ion Secondary Battery

A lithium-ion secondary battery of Comparative Example 3 was produced in the same manner as in Example 1 except for the fact that the cathode material C13 of Comparative Example 3 was used.

Comparative Example 4

Synthesis of Cathode Material A

A cathode material A14 of Comparative Example 4 was obtained in the same manner as in Example 1.

Synthesis of Cathode Material B

A cathode material B14 of Comparative Example 4 was obtained in the same manner as in Example 1.

Mixing of Cathode Material A and Cathode Material B

The cathode material A14 and the cathode material B14 were uniformly mixed together so that the mass ratio (the cathode material B/the cathode material A) reached 0.136, and the obtained powder was considered as a cathode material for a lithium-ion secondary battery (cathode material C14) of Comparative Example 4.

Production of Lithium-Ion Secondary Battery

A lithium-ion secondary battery of Comparative Example 4 was produced in the same manner as in Example 1 except for the fact that the cathode material C14 of Comparative Example 4 was used.

Evaluation of Lithium-Ion Secondary Batteries

On the lithium-ion secondary batteries of Examples 1 to 4 and Comparative Example 1 to 4, charge and discharge tests and over charge tests were performed as described below.

(1) Charge and Discharge Test

The lithium-ion secondary battery was constant current charged at a current value of 0.1 C at an environment temperature of 60° C. until the battery voltage reached 4.2V and then was constant voltage charged until the current value reached 0.01 C. After that, the lithium-ion secondary battery was constant current discharged until the battery voltage reached 2 V at the current value of 0.1 C, and the discharge capacity a was evaluated.

(2) Over Charge Test

The lithium-ion secondary battery was constant current charged at a current value of 0.1 C at an environment temperature of 60° C. until the battery voltage reached 4.5 V and then was constant voltage charged for seven days. After that, the lithium-ion secondary battery was constant current discharged until the battery voltage reached 2 V at the current value of 0.1 C, and the discharge capacity was evaluated. The ratio (capacity retention) of the discharge capacity b obtained in the overcharge test (2) as the numerator to the discharge capacity a obtained in the charge and discharge test (1) as the denominator was evaluated as the deterioration of the battery capacity due to the over charge test.

Next, the pouch cell that had undergone the over charge test was opened in water, and gas in the pouch cell was collected using a measuring cylinder, whereby the amount of gas generated was evaluated. In addition, the amount of gas generated was also evaluated using the Archimedes method, and a similar tendency was shown.

Evaluation Results

The evaluation results of the lithium-ion secondary batteries of Examples 1 to 4 and Comparative Examples 1 to 4 are shown in Table 1.

Figure 2:
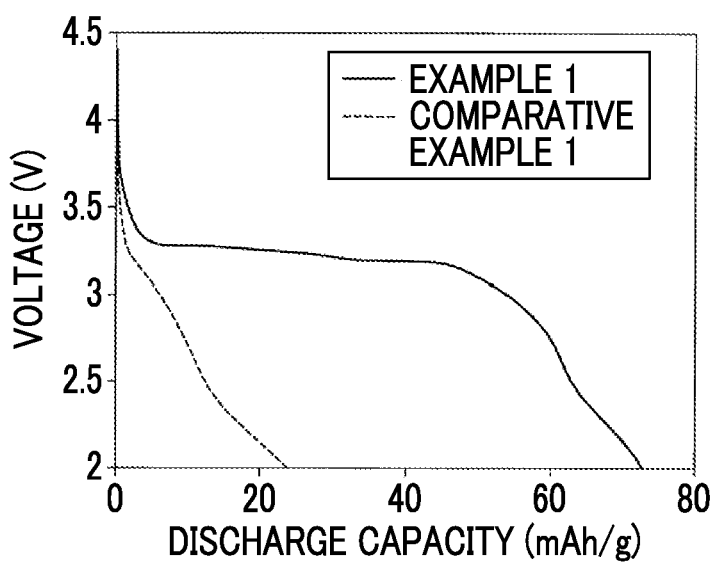
FIG. 2 is a view illustrating discharge capacities after the over charge tests in Example 1 and Comparative Example 1.

In addition, the fluctuation in the current values during the over charge tests in Example 1 and Comparative Example 1 is illustrated in FIG. 1. Furthermore, the discharge capacities after the over charge tests in Example 1 and Comparative Example 1 is illustrated in FIG. 2

TABLE 1

|  | Cathode material A | Cathode material B | Mass ratio (cathode material B/cathode material A) | Amount of gas generated [cc] | Capacity retention [%] |
|---|---|---|---|---|---|
| Example 1 | Carbonaceous coating LiFePO$_4$ | LiFePO$_4$ | 0.053 | 3 | 57 |
| Example 2 | Carbonaceous coating LiFePO$_4$ | LiMnPO$_4$ | 0.053 | 3.3 | 55 |
| Example 3 | Carbonaceous coating LiMn$_{0.7}$Fe$_{0.3}$PO$_4$ | LiMnPO$_4$ | 0.053 | 5.2 | 46 |
| Example 4 | Carbonaceous coating LiFePO$_4$ | LiFePO$_4$ | 0.01 | 3.9 | 52 |
| Comparative Example 1 | Carbonaceous coating LiFePO$_4$ | None | — | 6 | 18 |
| Comparative Example 2 | Carbonaceous coating LiMn$_{0.7}$Fe$_{0.3}$PO$_4$ | None | — | 8.1 | 6 |
| Comparative Example 3 | Carbonaceous coating LiFePO$_4$ | LiFePO$_4$ | 0.001 | 5.9 | 18 |
| Comparative Example 4 | Carbonaceous coating LiFePO$_4$ | LiFePO$_4$ | 0.136 | 2.5 | 19 |

When Examples 1 to 3 and Comparative Examples 1 and 2 are compared with each other using the results in Table 1, it could be confirmed that, in the lithium-ion secondary batteries of Examples 1 to 3 to which the cathode material B was added, the amounts of gas generated decreased more and the capacity retention after the over charge test increased more than those in the lithium-ion secondary batteries of Comparative Examples 1 and 2 to which the cathode material B was not added.

In addition, when Examples 1 and 4 and Comparative Examples 3 and 4 are compared with each other, it could be confirmed that, in Comparative Example 3 in which the mass ratio (the cathode material B/the cathode material A) was small, the amount of gas generated was great, and the capacity retention after the over charge test was low. In addition, it could be confirmed that, in Comparative Example 4 in which the mass ratio (the cathode material B/the cathode material A) was great, the amount of gas generated was small, but the capacity retention was low. The reason for the low capacity retention in Comparative Example 4 is considered that the electron conductivity of the cathode was low.

In addition, it was found from the results of FIG. 1 that, in the lithium-ion secondary battery of Example 1, the current value during the over charge test was stable, but the current value during the over charge test was not stable in the lithium-ion secondary battery of Comparative Example 1.

Furthermore, it was found from the results of FIG. 2 that the discharge capacity was greater in the lithium-ion secondary battery of Example 1 than the lithium-ion secondary battery of Comparative Example 1.

INDUSTRIAL APPLICABILITY

Cathodes for a lithium-ion secondary battery using the cathode material for a lithium-ion secondary battery of the present invention suppress the oxidation and decomposition of electrolytic solutions and the generation of gas, thus, are capable of improving long-term cycle stability and safety, and are capable of significantly contributing to improvement in the reliability of lithium-ion secondary batteries in, mainly, moving vehicle usage.

What is claimed is:
1. A cathode material for a lithium-ion secondary battery comprising:
    a cathode material A which comprises central particles of a cathode active material consisting of LiFePO$_4$, or LiMn$_{0.7}$Fe$_{0.3}$PO$_4$, and a carbonaceous film formed on a surface of the central particles; and
    a cathode material B which comprises primary particles of a cathode active material consisting of LiFePO$_4$, or LiMnPO$_4$, in a mass ratio between the cathode active material A and the cathode active material B (the cathode active material B/the cathode active material A) being 0.01 or more and 0.053 or less.
2. A cathode for a lithium-ion secondary battery comprising:
    the cathode material for a lithium-ion secondary battery according to claim 1.
3. A lithium-ion secondary battery comprising:
    a cathode;
    an anode; and
    a non-aqueous electrolyte,
    wherein the cathode is the cathode for the lithium-ion secondary battery according to claim 2.

* * * * *